Feb. 19, 1963
L. D. ATKINS ET AL
3,078,365
CONTINUOUS COMBUSTION SIGNAL LAMP
Filed May 4, 1962
3 Sheets-Sheet 1
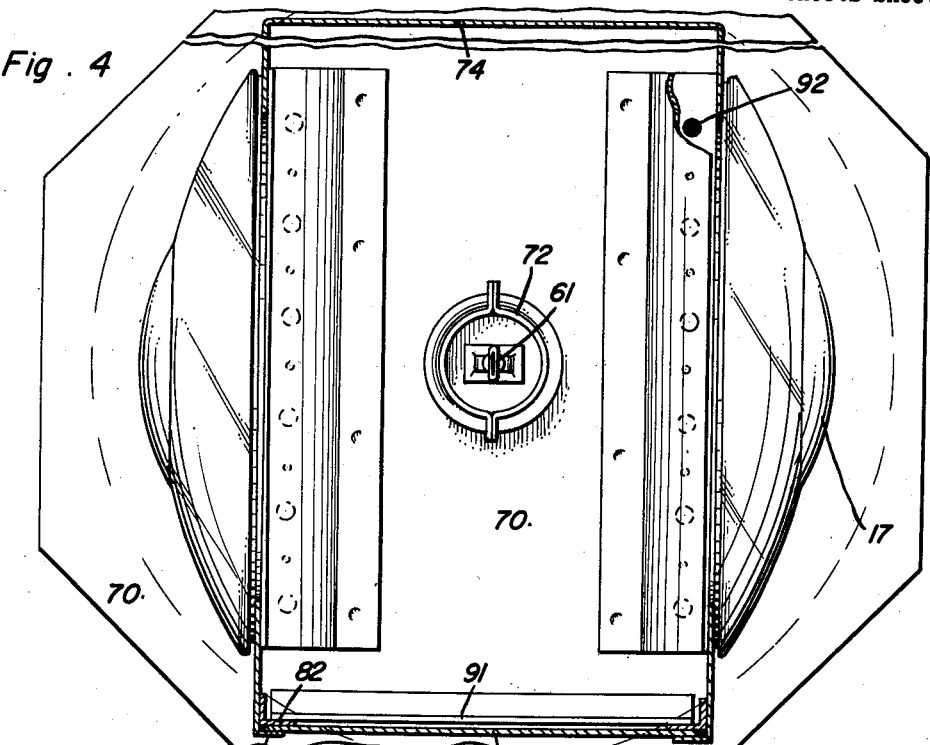
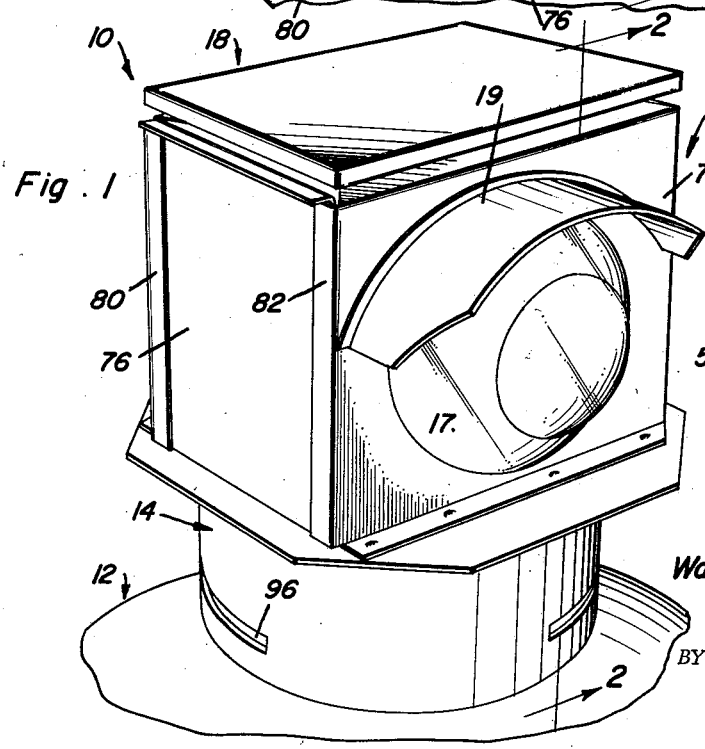
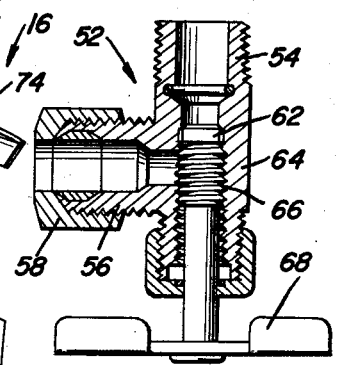
Lyle D. Atkins
Warren E. Holmgreen, Jr.
INVENTORS

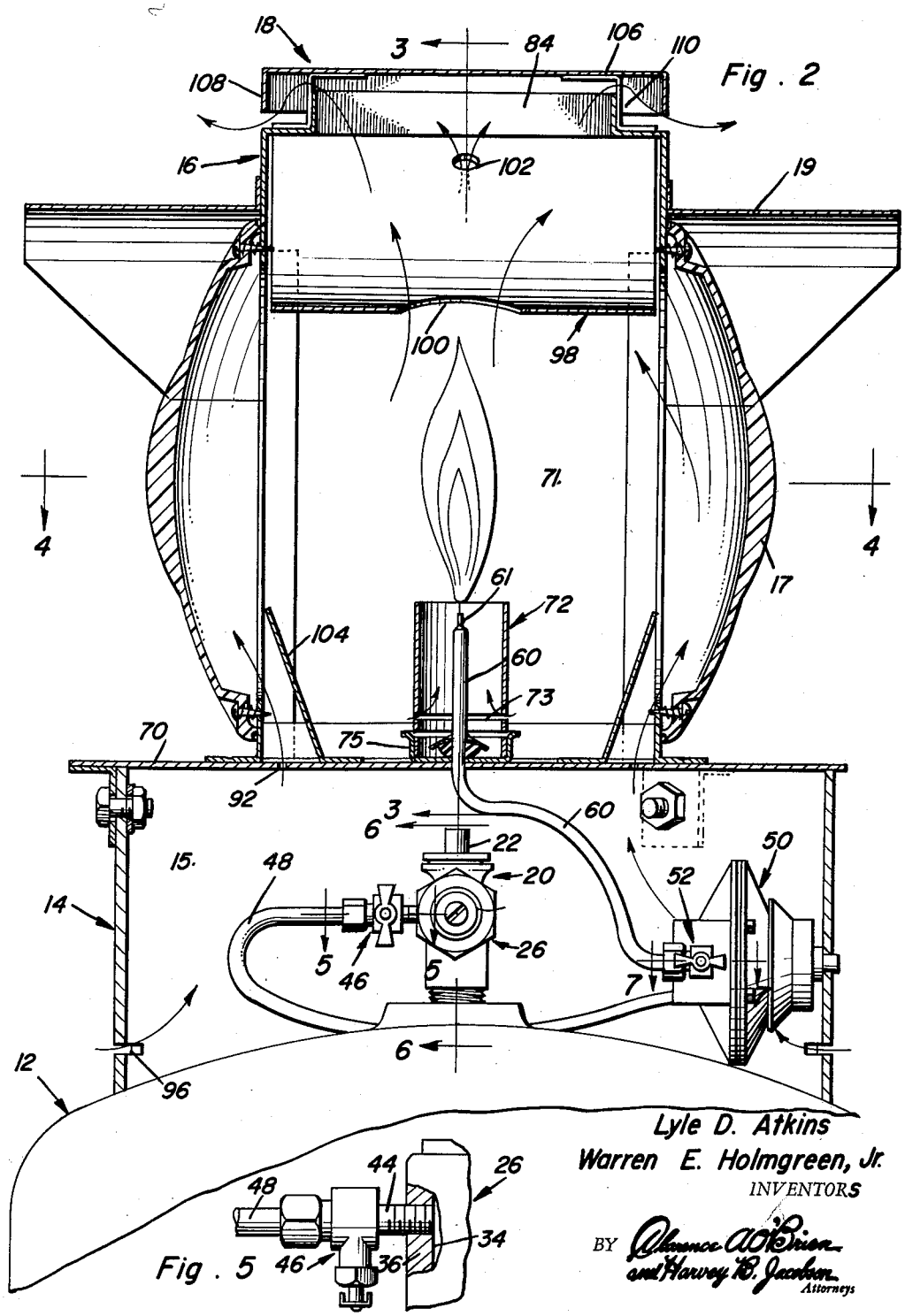

Feb. 19, 1963   L. D. ATKINS ET AL   3,078,365
CONTINUOUS COMBUSTION SIGNAL LAMP
Filed May 4, 1962   3 Sheets-Sheet 3

Lyle D. Atkins
Warren E. Holmgreen, Jr.
INVENTORS

United States Patent Office 3,078,365
Patented Feb. 19, 1963

3,078,365
CONTINUOUS COMBUSTION SIGNAL LAMP
Lyle D. Atkins and Warren E. Holmgreen, Jr., San Antonio, Tex., assignors, by mesne assignments, to Warning Lites Company, Inc., San Antonio, Tex., a corporation of Texas
Filed May 4, 1962, Ser. No. 192,466
3 Claims. (Cl. 240—11)

This invention relates to lamps which emit light of fluctuating intensity and more particularly to a combustion type of lamp capable of providing a light signal under adverse weather conditions for various purposes such as road warnings, direction beacons, outdoor advertising displays, etc. This application constitutes a continuation-in-part of prior co-pending application U.S. Ser. No. 133,717, filed August 24, 1961, now abandoned.

It is a primary object of the present invention to provide a flickering type of signal lamp that involves combustion of a vaporized liquid hydrocarbon fuel to produce a continuous yet flickering and difficult to extinguish flame providing a warning signal without the use of any mechanical moving parts, battery sources of power, pilot flame controls, or replaceable wick arrangements, so as to provide a more rugged, reliable and less costly signal lamp from both a manufacturing and maintenance standpoint.

Another object of this invention is to provide a signal lamp relying on combustion to produce illumination as well as heat so distributed as to provide protection against low temperature affects of weather that have heretofore rendered lamps inoperative without the use of insulative covering.

A further object of this invention is to provide a signal lamp for which a supply of combustion supporting air is derived from the atmosphere, said lamp being however protected from the adverse flame extinguishing affects of atmospheric wind and precipitation which have heretofore rendered such signal lamps impracticable.

An additional object of this invention is to provide a signal lamp wherein the illumination producing flame has an intensified flicker providing the alerting signal without interruption of the flame so as to make the lamp difficult to extinguish. The fuel for producing the flame is therefore supplied by a nozzle to an illumination chamber into which combustion supporting air is drawn at a control volumetric rate of flow sufficient to support combustion therein as a result of which a flickering light is produced, the flicker being intensified by deflection of airflow about the flame and baffling outflow of the air and combustion products.

Other objects of the present invention include the provision of flame restricting apertures forming an air supply passage through the chamber enclosing the fuel flow control mechanism to the light exposing illumination chamber for the purpose of preventing any dangerous buildup of leakage fuel from the flow control devices by removal of such leakage fuel without the danger of flashback. The flame restricting apertures are also arranged in relation to air deflectors and an outflow baffle member within the illumination exposing chamber so as to prevent the establishment of flame extinguishing circulating currents within the illumination chamber and to intensify the flame flicker in cooperation with the fuel jet nozzle. The various features of the present invention as hereinbefore mentioned therefore cooperate to produce an economical signal lamp having unexpected ruggedness, and prominent flickering signal operation as well as resistance to flame extinguishing influences.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the signal lamp assembly of the present invention.

FIGURE 2 is a sectional view taken substantially along the plane indicated by section line 2—2 in FIGURE 1.

FIGURE 4 is a partial sectional view taken through a plane indicated by section line 4—4 in FIGURE 2.

FIGURE 5 is a partial sectional view with parts broken away, taken along the plane indicated by section line 5—5 in FIGURE 2.

FIGURE 7 is a partial sectional view taken through a plane indicated by section line 7—7 in FIGURE 2.

Figure 3:
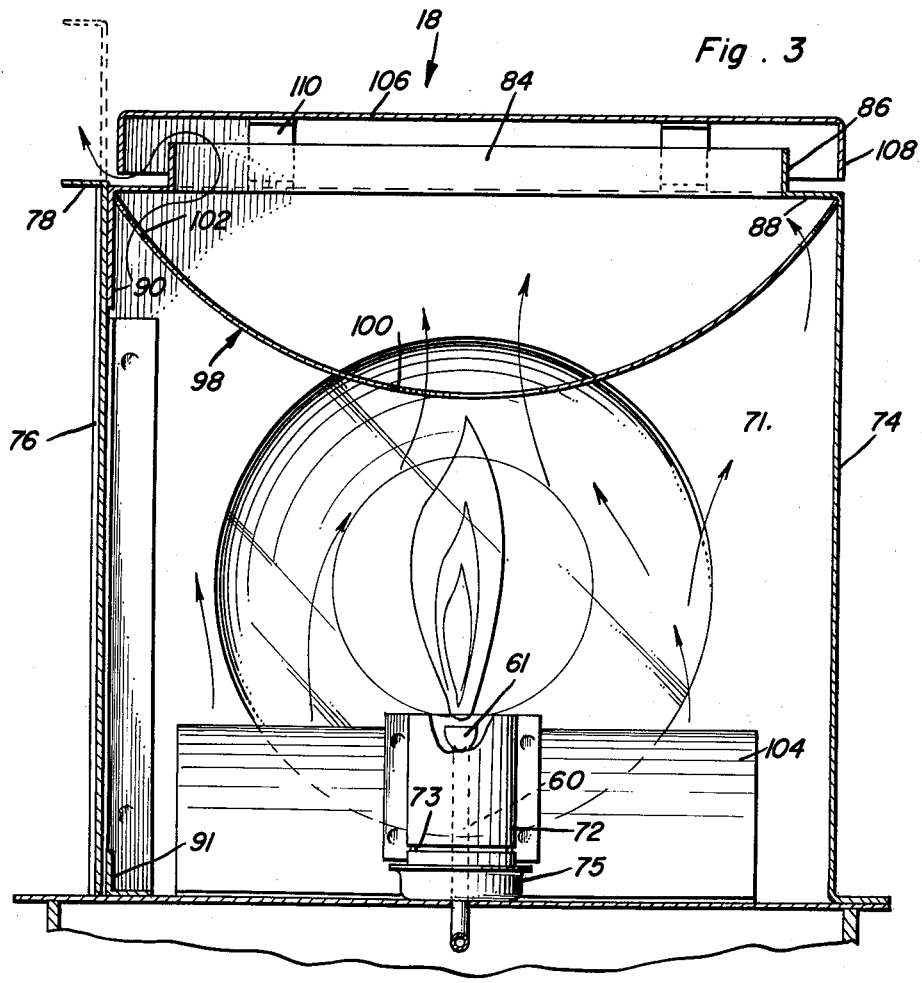
FIGURE 3 is a partial sectional view taken through a plane indicated by section line 3—3 in FIGURE 2.

Referring now to the drawings in detail, it will be observed in FIGURE 1 that the signal lamp is generally referred to by reference numeral 10 and includes a fuel supply in the form of a liquid fuel tank or reservoir 12 of any suitable type preferably containing a supply of a volatile petroleum product, the fumes of which form a gaseous combustible fuel. Mounted above the tank is a base housing 14 constituting both a supporting base for a light transmitting housing 16 and an enclosure for fuel controls. The illumination housing walls may mount colored lenses 17 protected by shields 19 optically arranged to transmit the optimum amount of light and light patterns through the exercise of optical expedients well known to those skilled in the art. Mounted above the illumination housing 16 in protective relation thereto is a baffle closure assembly generally referred to by reference numeral 18 by means of which a continuous and steady exhaust of air and combustion products formed within the illumination housing may take place while at the same time protecting the chamber from adverse affects of atmospheric wind and precipitation.

Figure 6:
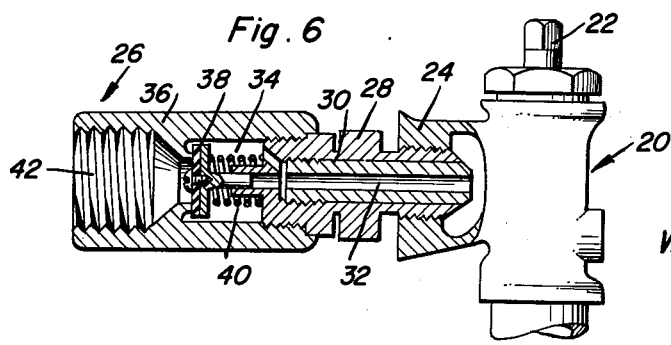
FIGURE 6 is a partial sectional view taken through a plane indicated by section line 6—6 in FIGURE 2.

FIGURE 2 in particular illustrates the fuel supply for the housing 16. It will be observed that a control valve chamber 15 is formed by the housing 14 seated on top of the fuel tank to which a tank valve 20 is threadedly connected for supply therethrough of gaseous fuel. The supply of gaseous fuel may accordingly be shut off by a tool applied to the stem 22 of the tank valve. As more clearly seen in FIGURE 6, the tank valve 20 includes a gaseous fuel outlet portion 24 into which a back check filler valve assembly 26 is connected through a fitting 28. The fitting 28 supports therewithin a fuel conducting conduit 30 forming a passage 32 for gaseous fuel that enters into the chamber 34 of the valve body 36. The fitting 28 accordingly slidably mounts at its inner end within the chamber 34, a one-way check valve element 38 biased by the spring 40 to close off a threaded inlet 42 through which liquid fuel may be conducted by a hose attached to the inlet 42 for the purpose of refilling the tank 12 with liquid fuel. It will therefore be apparent that when gaseous fuel is flowing through chamber 34, the check valve 38 will be closed. During refilling however, liquid fuel may enter past the one-way check valve element 38 for supply through passage 32 to the tank valve 20 and therefrom into the fuel tank 12. Therefore, during refilling, the gaseous fuel outlet 44 from the chamber 34 as seen in FIGURE 5, must be closed off by the needle valve assembly 46 which is otherwise open so that gaseous fuel may flow from the filler valve assembly 26 into the flexible conduit 48. The conduit 48 therefore conducts the gaseous fuel through a pressure regulator 50 mounted on the wall of chamber 14, from which the fuel enters an adjustable filter valve assembly 52 through the inlet portion 54 thereof as more clearly seen in FIGURE 7. The outlet 56 of the valve 52 is therefore connected by a fitting 58 to the flexible outlet conduit 60 with the volumetric rate of fuel flow being controlled by the positioning of the valve element 62 within the valve body 64 by means of axial movement of the threaded portion 66 in response to adjustable rotation of the valve control knob 68.

The discharge end of the conduit 60 within the illuminating housing 16 is therefore formed as a nozzle 61 for discharge of gaseous fuel under controlled pressure at a predetermined high velocity. In this manner, the air fuel mixture ratio may be controlled to produce the desired flame upon ignition having a natural flickering quality.

It will be observed that the gaseous fuel outlet conduit 60 extends upwardly through an aperture provided in a plate member 70 which closes the top of the flow valve control chamber 15 and the bottom of the illumination exposing chamber 71 formed by the housing 16. The outlet conduit terminates in the restricted nozzle portion 61 which is surrounded by a carburetion control device generally referred to by the reference numeral 72 for controlling the amount of air mixing with the fuel. The mixing control device 72 is therefore in the form of a tubular conduit having inlet slots 73 adjacent the bottom portion thereof supported on and centrally disposed with respect to the plate member 70 by the supporting cup 75. Thus, in response to the flow of fuel from the nozzle 61, at a relatively high velocity, air will be drawn through the restricted inlet slots 73 and conducted upwardly in the same direction as the flow of fuel for mixing therewith so as to produce a flickering flame when ignited in the usual manner. Also supported on the plate member 70 in enclosing relation to the mixing control device 72, is the light exposing housing 16. The housing 16 is made of any suitable material including vertical fixed walls 74 and a removable wall section 76 having a projecting flange 78 at the upper end thereof as seen in FIGURE 3, facilitating removal of the wall section slidably received between guide flanges 80 and the angle members 82 that are connected to the fixed walls 74. From FIGURES 3 and 4, it will be observed that an open end portion 84 of the housing 16 includes sides 86 that are spaced inwardly from the housing walls 74 and connected thereto by an annular horizontal surface portion 88. The portion 88 is therefore connected to the vertical walls 74 and includes a portion 90 spaced above a lower angle member 91 to form an opening closed by the removable wall section 76 whereby removal of the wall section 76 permits servicing of the lamp by providing access to the illumination exposing chamber 71 formed therewithin. Inasmuch as combustion occurs within the chamber 71, the open end portion 84 of the housing 16 is closed by the baffle closure assembly 18 as hereinbefore indicated while the lower end of the chamber is closed by the plate member 70. While the baffle closure assembly 18 provides fluid communication to the chamber 71, fluid communication is also provided between the chamber 71 and the flow valve control chamber 15 in order to form an air inlet passage therethrough so as to remove leakage fuel within chamber 15 and prevent any dangerous buildup therein. Accordingly, spaced apertures 92 are disposed on opposite longitudinal sides of the plate member 70 as more clearly seen in FIGURES 2 and 4. The apertures 92 furthermore mount flame retarding screen inserts so as to prevent flashback.

Air is supplied at a controlled volumetric rate to the illumination exposing chamber 71 sufficient to support combustion therewithin characterized by a flame having an inherent flickering quality. Referring therefore to FIGURES 2 and 3, it will be observed that air will be drawn upwardly through the air mixing device 72 in response to the jet flow of vaporized fuel from the nozzle 61 to ordinarily produce a naturally flickering flame within the illumination chamber 71 of the housing 16. The thermal flow effect of the flame will also produce airflow from inlet slots 96 in the base housing 14 through the chamber 15 and into the illumination exposing chamber 71. The flame retarding inlets 92 to the chamber 15 are however disposed behind the deflectors 104 so as to direct air current in spaced relation on opposite sides of the flame. Mounted within the upper portion of the chamber 71 is an arcuate outflow baffle member 98 having a large central opening 100 aligned with the tubular air mixing device 72 so as to receive the upward flow of air, fuel and combustion products from the tubular member 72 and the flame developed thereabove. The small side apertures 102 on the other hand receive unused air as well as any diverted gases issuing from the mixing device 72 thereby insuring vertical flow of gases to prevent development of any flame extinguishing circulatory currents within the illumination chamber 71. A vertical flow of air deflected to opposite sides of the flame by deflectors 104 will therefore be available to intensify the flame flicker by intermittent diversion into mixing relation with fuel to intensify combustion. The diversion of air will however not produce any circulatory flow since an upward thermal flow would displace the gases along the curved wall of the outflow baffle member 98 toward the outlet apertures 102 and into the space thereabove for escape from the baffle closure assembly 18. It will therefore be noted, that the outlet apertures 102 are located adjacent to the sides of the baffle assembly 18 whereas the discharge opening 100 through which most of the combustion products are discharged, is remote from the exhaust portions of the baffle closure assembly.

The provision of the baffle closure assembly 18 is therefore of particular significance in augmenting the continuous and uninterrupted flame attribute of the present invention. Referring therefore to FIGURES 2 and 3 once again, it will be observed that the closure assembly 18 includes a top protective cover member 106 having downwardly projecting sides 108 disposed just below the upper edge of the sides 86 of the portion 84. Accordingly, gases must proceed through the wavy path as indicated by the arrows in FIGURE 2. The cover member 106 is therefore supported in spaced relation above the portion 84 by mounting elements 110 connected to the sides 86 and the cover member 106 respectively. The tortuous path thus established will absorb the kinetic energy of the airflow or wind to prevent extinguishing the flame within the illumination chamber while at the same time the presence of the top member 106 restricting the flow of air into the illuminating chamber in a lateral and upward direction, will protect the illumination chamber from the adverse affect of atmospheric precipitation.

From the foregoing description, operation and utility of the invention will be apparent. It will therefore be appreciated that the signal lamp of the present invention will provide a positive flickering light and will continue to function despite any rough treatment or adverse weather conditions to which it may be exposed such as high winds, precipitation or temperature extremes. Also, because of the absence of moving mechanical linkages, pilot flames, gas accumulators for intermittent fuel supply and wick arrangements, for producing the flickering flame signal, the lamp may be manufactured with unexpected economy and ruggedness and yet provide a prominently flickering signal. This is achieved solely by the control of airflow currents within the illumination chamber to avoid development of circulatory current while at the same time magnifying the inherent flicker of the flame. The phenomenon of magnified flicker in connection with a continuous flame through use of the apparatus described, is an observed fact for which reason no theoretical explanation is required. However, various theoretical explanations may be available. Firstly, it will be appreciated that by proper selection of the size of the inlet slots 73 and the nozzle throat of the fuel nozzle 61, the volumetric supply of air for mixing with the fuel or carburetion is controlled to produce the flame having an inherent flicker because of incomplete combustion. Thus, the rate of combustion varies by a small amount between a maximum value and a minimum value to produce flicker by increase and decrease of the flame between the maximum and minimum limits. Thus, when approaching maximum combustion, there will be a greater tendency for the vertical flow of air on opposite sides of the flame to be diverted through the central opening 100 so as to mix with incomplete combustion products enlarging the flame. When approaching minimum combustion, the upward flow of gases from the tubular mixing device 72 would be increasing because of less combustion with a tendency of said flow of gases to be diverted by the walls of the baffle member 98 to the outlets 102 away from the heated area of the flame. This therefore results in increasing the maximum rate of combustion and decreasing the minimum rate of combustion from that which would otherwise occur without the directed flow of air from the deflectors 104 between the outlet opening 100 and the outlet apertures 102. The latter sequence of operations is therefore offered as one explanation for the intensification of the flame flicker without reducing its ability to resist extinction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with a container of vaporized liquid hydrocarbon fuel having a metering conduit and nozzle end thereof, a signal lamp comprising
    (a) a base plate having openings therethrough, one of said openings being substantially central of said plate and adapted to receive a metering conduit nozzle, the other openings lying to opposed sides of said central opening,
    (b) a flame carburetion control tube upstanding from said base plate and adapted to surround the nozzle end of a metering conduit, said flame carburetion control tube having openings therethrough proximate the base thereof, said flame carburetion control tube adapted to extend above a metering conduit,
    (c) an illumination chamber having lenses illuminated by the flame and enclosing said flame carburetion control tube,
    (d) draft deflection baffles carried by said base plate within said illumination chamber between the openings in said base plate and said carburetion control tube, said draft deflection baffles extending upwardly and outwardly from said base plate along the length of said carburetion control tube and adjacent thereto to a point proximate the top thereof,
    (e) indirect exhaust means above said illumination chamber to permit passage of products of combustion by convection and to protect the flame from the elements, and
    (f) a diffuser baffle at the top of the illumination chamber between said exhaust means and said flame carburetion control tube.

2. A signal lamp as claimed in claim 1, wherein
    (h) said diffuser baffle at the top of the illumination chamber is arcuate along its major axis and has a central opening therethrough to permit the products of combustion to communicate between the illumination chamber and the indirect exhaust means.

3. A signal lamp as claimed in claim 1, wherein
    (h) said openings in the flame carburetion tube are in the form of slits through the side walls thereof proximate the base for the introduction of combustion supporting air, and wherein
    (i) the diameter of the flame carburetion control tube adapted to exceed the diameter of a metering conduit and nozzle, and
    (j) said flame carburetion control tube is adapted to be concentric with a metering conduit and nozzle.

References Cited in the file of this patent

UNITED STATES PATENTS

| 536,603 | Conklin | Apr. 2, 1895 |
| 2,135,826 | Marischal | Nov. 8, 1938 |
| 2,796,753 | Wallgren | June 25, 1957 |

FOREIGN PATENTS

| 9,867 | Great Britain | 1902 |
| 343,579 | Great Britain | Feb. 23, 1931 |
| 212,421 | Australia | Jan. 10, 1958 |

OTHER REFERENCES

Rubbel, German application, Serial Number O 3487, printed July 12, 1956 (Kl. 74 d 8$_{03}$).